US005982349A

United States Patent [19]

Yoon

[11] Patent Number: 5,982,349

[45] Date of Patent: Nov. 9, 1999

[54] MULTIPLE VOLTAGE GENERATOR FOR DRIVING LCD PANEL

[75] Inventor: Sang Young Yoon, Inchun-si, Rep. of Korea

[73] Assignee: LG Electronics, Inc., Seoul, Rep. of Korea

[21] Appl. No.: 08/744,302

[22] Filed: Nov. 6, 1996

[30] Foreign Application Priority Data

Jan. 20, 1996 [KR] Rep. of Korea ........................ 96-1210

[51] Int. Cl.$^6$ ........................ G09G 3/36

[52] U.S. Cl. ........................ 345/98; 345/211

[58] Field of Search ........................ 345/89, 147, 95, 345/100, 210, 211, 98, 87; 327/355

[56] References Cited

U.S. PATENT DOCUMENTS 5,581,210 12/1996 Kimura ........................ 327/355

5,583,530 12/1996 Mano et al. ........................ 345/89

OTHER PUBLICATIONS

Saito, S. et al., "A 6–bit Digital Data Driver for Color TFT–LCDs", Society for Information Display International Symposium Digest of Technical Papers, vol. XXVI pp. 257–260, 1995.

Joseph N. Babanezhad et al., "A 20–V Four–Quadrant CMOS Analog Multiplier", IEEE Journal of Solid–State Circuits, sc–20(6): 1158–1168 (1985).

*Primary Examiner*—Richard A. Hjerpe
*Assistant Examiner*—Francis Nguyen
*Attorney, Agent, or Firm*—Morgan, Lewis & Bockius LLP

[57] ABSTRACT

A multiple voltage generator for driving a liquid crystal display (LCD) panel by a video data is provided. The video data has a first part and a second part. The voltage generator comprises: a voltage selector receiving a first part of the video data, and outputting first and second voltage levels according to the first part of the video data, where the first and second voltage levels define a first voltage interval; a weight voltage generator receiving a second part of the video data, and outputting a second voltage interval; a multiplier connected to the voltage selector and the weight voltage generator so as to receive the first and second voltage levels and the second voltage interval, the multiplier multiplying the first voltage interval by the second voltage interval with a multiplication factor to output a multiplication voltage; and an adder connected to the voltage selector and the multiplier so as to receive the first voltage level and the multiplication voltage, and the adder adding the first voltage level to the multiplication voltage to output a driving voltage.

6 Claims, 3 Drawing Sheets

MULTIPLE VOLTAGE GENERATOR FOR DRIVING LCD PANEL

BACKGROUND OF THE INVENTION

1. Field of the Invention

The present invention relates to a multiple voltage generator, and more particularly, to a multiple voltage generator for driving a liquid crystal display (LCD) panel.

2. Discussion of the Related Art

Flat panel displays have been increasingly used in general computers and television sets as well as notebook computers. Among the flat panel displays, an LCD is widely used. The LCD display includes an LCD panel and a panel driver for driving the LCD panel. In driving the LCD panel, $2^m$ voltage sources are necessary to display an m-bit picture signal. However, if the picture signal exceeds 5 bits, it is practically impossible to provide such a large number of the voltage sources corresponding to all the gray scale levels. Thus, various researches have been attempted to develop an alternative way to display the gray scale levels with fewer voltage sources.

One method is to create virtual intermediate levels. There have been proposed a frame rate control method and a dithering method. In the frame rate control method, an intermediate gray scale between two voltage levels is obtained by turning a pixel on and off during several frames. In the dithering method, an intermediate level is determined by using a mean value at which several pixels bound into one are turned on and off.

Another method of representing intermediate levels is to generate voltages corresponding to the intermediate levels. This includes an interpolation method and an intermediate voltage selection method. In the interpolation method, the desired mean value of a square wave, which is to be applied to a pixel, is obtained by adjusting the duty ratio of the square wave. In the intermediate voltage selection method, multiple voltage levels between two predetermined voltage levels are obtained by a voltage dividing resistor connected to the two voltage levels.

The interpolation method utilizes a SCOL circuit as shown in FIG. 1. Signals TM1, TM2, TM3 and TM4 are square waves whose duty ratios are 1:7, 2:6, 3:5 and 4:4, respectively. The TM waves of these signals are inverted to form signals whose duty ratios are 1:7, 2:6, 3:5, 4:4, 5:3, 5:2, 7:1 and 8:0. The upper 3 bits of the 6-bit video data signal VD select two voltage levels forming both ends of eight voltage level intervals, i.e., two of S0, S8, S16, S24, S32, S40, S48, S56, and S64. The lower 3 bits select one of eight TM waves to form 64 square waves. Thus, 64 voltage levels are applied to a pixel which can be modeled by a lowpass filter (LPF). If the frequency of the square wave is higher than the cut-off frequency of the LPF, only the mean value of the square waves is applied to the pixel, i.e., 64 voltage levels are applied thereto.

The intermediate voltage selection method utilizes a digital-to-analog converter circuit (DAC) as shown in FIG. 2. The upper 3 bits of a 6-bit video data are decoded in a decoder 20, and the decoded signal is transferred to the first and second voltage selectors 22 and 23. According to the decoded signal, the first voltage selector 22 selects one voltage level out of eight voltage levels V0 to V7, and the second voltage selector 23 selects another voltage out of eight voltage levels V1 to V8. The selected voltage levels are transferred to a voltage dividing resistor block (VDRB) 24. The VDRB 24 generates eight voltage levels between the two selected voltage levels, and the eight voltage levels are transferred to the third voltage selector 25. The lower 3 bits of the video data is decoded at a decoder 21, and the decoded signal is transferred to the third voltage selector 25. The third voltage selector 25 outputs one of the eight voltage levels according to the decoded signal. For example, when the video data is 100100, the first voltage selector 22 selects a voltage level V4, and the second voltage selector 23 selects a voltage level V5. The selected voltage levels V4 and V5 are transferred to the VDRB 24. The VDRB 24 generates eight voltage levels between the two voltages V5 and V4. A voltage signal having a magnitude of $(V_5-V_4)\times 4/8$ is selected by a third voltage selector 25. A signal of magnitude $V_4+(V_5-V_4)\times 4/8$ is then outputted. This way, 64 voltage levels are generated to display 64 gray scales.

The above-mentioned methods have the following drawbacks. The interpolation method requires a separate generator for generating a transverse magnetic (TM) wave. The intermediate selection method utilizes dividing resistors for generating voltages. Although the circuit is simple, the dividing resistors occupy a large area in the device. The conventional frame rate control method has a problem of flickering. In the dithering method, display resolution is sacrificed.

SUMMARY OF THE INVENTION

Accordingly, the present invention is directed to a multiple voltage generator for driving an LCD panel that substantially obviates one or more of the problems due to limitations and disadvantages of the related art.

An object of the present invention is to provide a multiple voltage generator for driving an LCD panel, which does not require a large number of voltage sources.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a multiple gray scale voltage generator for driving an LCD panel includes: a voltage selector for applying a multitude of reference voltage levels, selecting voltage intervals between the reference voltage levels by decoding some bits of video data and outputting voltage levels of both ends of the selected voltage intervals as first and second voltage levels; a voltage generator for forming multiple voltage level intervals between two predetermined voltage levels to generate a weight voltage, generating a voltage level interval among the multiple voltage level intervals by decoding bits remaining after being used in the voltage selector among a multitude of video data signals and outputting the voltages levels of both ends of the voltage level interval as third and fourth voltage levels; an analog multiplier for receiving the first and second voltage levels output from the voltage selector and the third and fourth voltage levels output from the voltage generator, multiplying a voltage between the first and second voltages with a voltage between the third and fourth voltages and outputting the multiplied voltage value as a multiplication voltage; and an analog adder for adding the first voltage level and the multiplication voltage and finally generating a multiple gray scale output voltage.

The voltage generator may be formed using three metal-oxide-semiconductor (MOS) transistors and a bias resistor, such that the respective sources and drains of the three MOS transistors are connected in parallel, the drains are connected to a power source via the bias resistor, partial bits among bits of video data are connected to the gates, thereby changing the current flowing the bias resistor according to the state of the video data to form the weight voltage, i.e., an electric level of both ends of the bias resistor, as the third and fourth voltage levels to then be output.

The analog multiplier adopts a Gilbert cell, for example. The analog adder is constituted by an adder and a differential amplifier whose amplification degree is 1. The multiplication voltage of the analog multiplier is inputted to the differential amplifier and is added to the first voltage level in the adder, thereby finally outputting a multiple gray scale output voltage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 3:
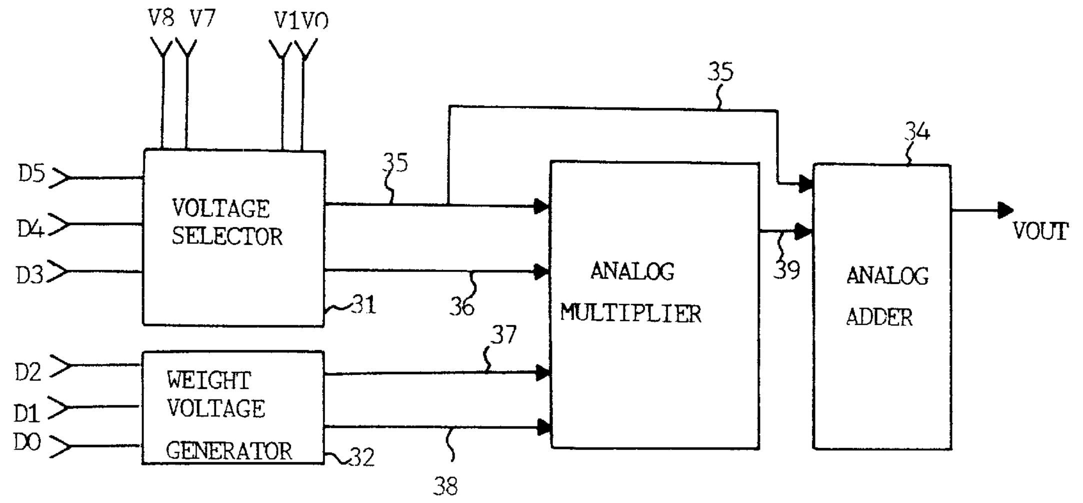
FIG. 3 is a block diagram of a multiple gray scale voltage generator according to the present invention.

As shown in FIG. 3, a multiple gray scale voltage generator according to the present invention is constituted by a voltage selector 31, a weight voltage generator 32, an analog multiplier 33 and an analog adder 34. In the rest of this specification, examples are taken in the case of 6-bit video data signal, unless mentioned otherwise.

The voltage selector 31 receives, for example, nine reference voltage levels V0, V1, V2, V3, V4, V5, V6, V7 and V8. Among these nine voltage levels, any two adjacent voltage levels define one voltage interval. Accordingly, there are eight such voltage intervals. In the voltage selector 31, the upper 3 bits of a 6-bit video data signal are decoded. According to the decoded signal, the voltage selector 31 selects two adjacent voltage levels which define one of the above-mentioned eight voltage intervals, and outputs the two voltage levels as a first voltage level 35 and a second voltage level 36, respectively.

The weight voltage generator 32 is capable of generating another set of eight voltage intervals, which are different from each other in magnitude. This time, the lower 3 bits of the 6-bit video data signal are decoded in the weight voltage generator 32. Then, according to the decoded signal, the weight voltage generator 32 selects one of the eight voltage intervals, and outputs two voltage levels defining the selected voltage interval, as a third voltage level 37 and a fourth voltage level 38.

The analog multiplier 33 receives the first and second voltage levels 35 and 36, and the third and fourth voltage levels 37 and 38. Then a voltage difference between the first and second voltages 35 and 36 is multiplied by a voltage difference between the third and fourth voltages 37 and 38. The resulting voltage value is outputted as a multiplication voltage 39.

The analog adder 34 adds the first voltage level 35 to the multiplication voltage 39 and finally generates a multiple output voltage $V_{out}$ for driving an LCD panel.

Figure 1:
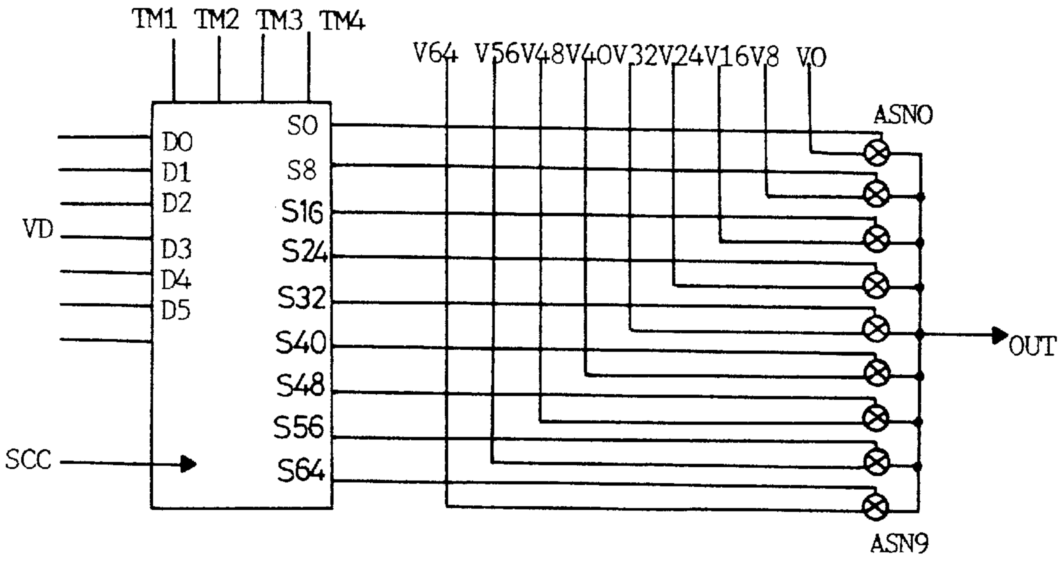
FIG. 1 PRIOR ART
FIG. 1 is a block diagram of a conventional multiple gray scale voltage generator using a SCOL circuit.
Figure 2:
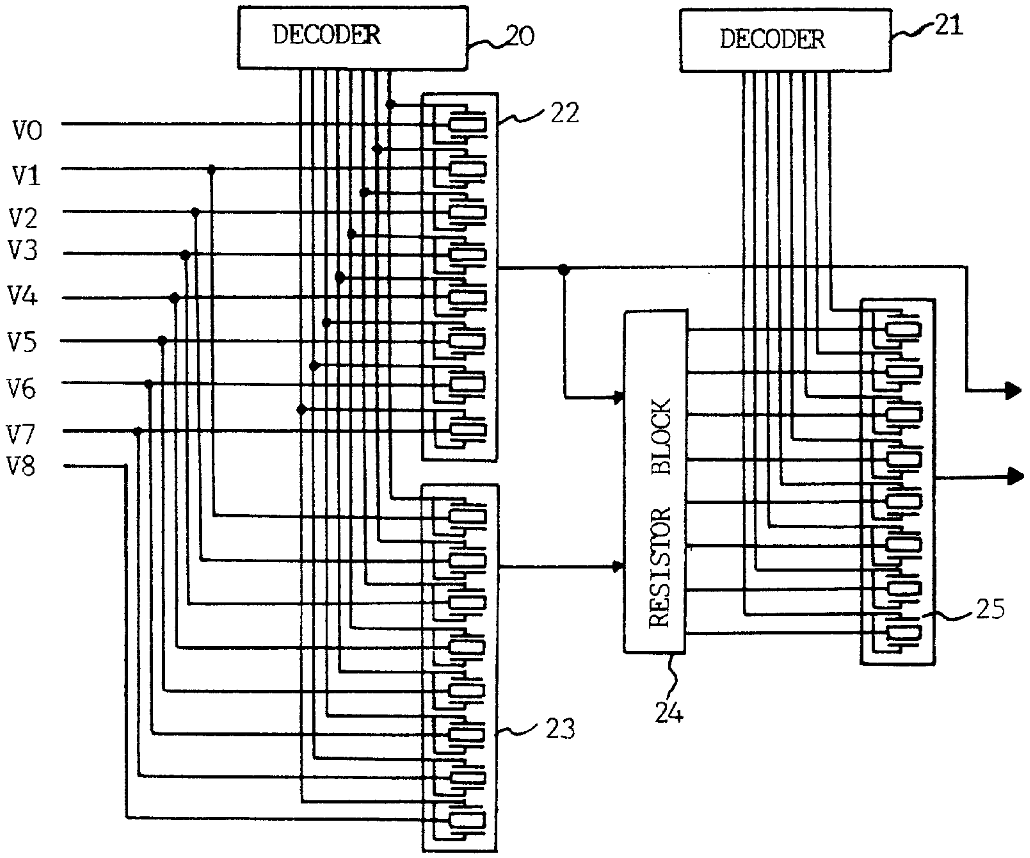
FIG. 2 PRIOR ART
FIG. 2 is a block diagram of a conventional multiple gray scale voltage generator using a DAC circuit.
Figure 4:
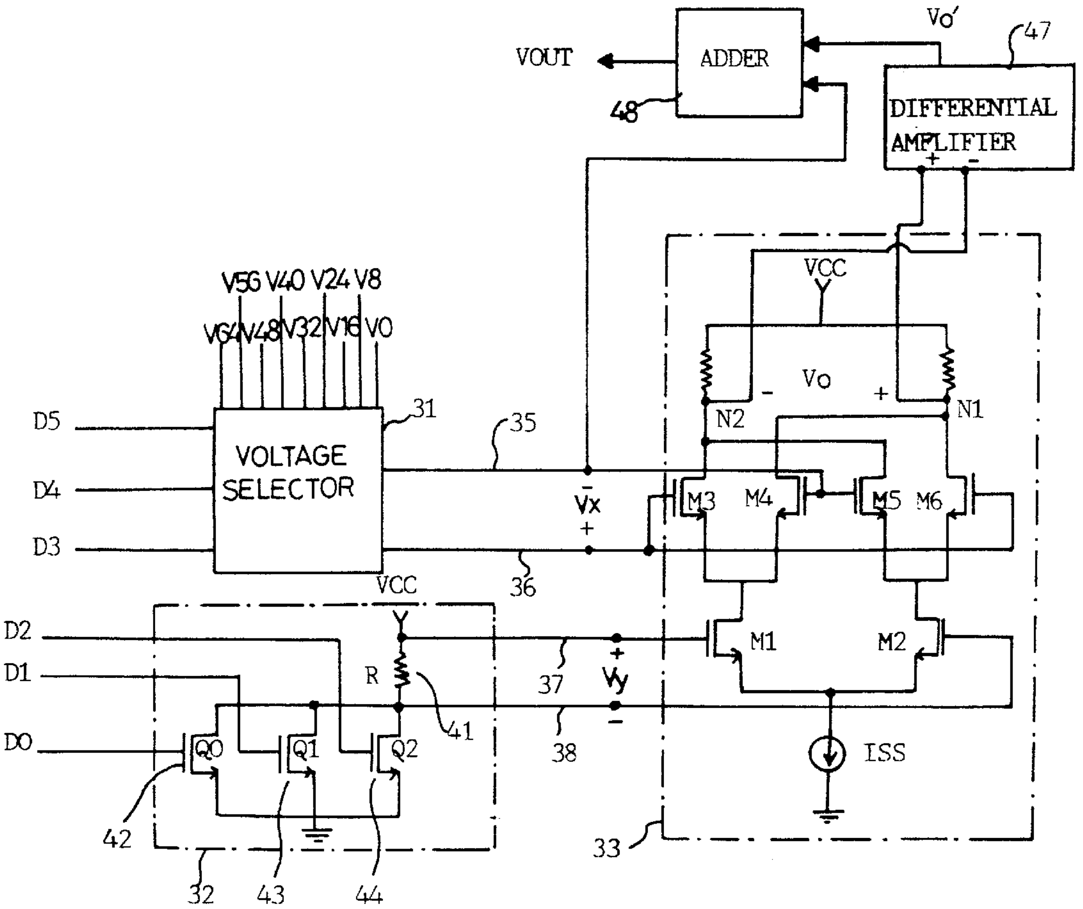
FIG. 4 is a circuit diagram showing a first embodiment of the present invention.

FIG. 4 is a circuit diagram showing a first embodiment of the present invention. The voltage selector 31 can be constituted by a first voltage selector, a second voltage selector and a decoder, as in FIG. 2. The upper 3 bits D3, D4 and D5 among 6 bits of a video data D0 through D5 are decoded in the decoder and two adjacent voltage levels defining the ends of eight voltage level intervals, i.e., two adjacent voltage levels among nine reference voltage levels V0, V8, V16, V24, V32, V40, V48, V56 and V64, are selected using the first and second voltage selectors and are outputted as the first voltage level 35 ($V_{out1}$) and second voltage level 36 ($V_{out2}$). Table 1 indicates the selected voltage levels according to the states of the bits D3, D4 and D5 of the video data.

TABLE 1

| D5 | D4 | D3 | $V_{out1}$ | $V_{out2}$ |
|---|---|---|---|---|
| 0 | 0 | 0 | V0 | V8 |
| 0 | 0 | 1 | V8 | V16 |
| 0 | 1 | 0 | V16 | V24 |
| 0 | 1 | 1 | V24 | V32 |
| 1 | 0 | 0 | V32 | V40 |
| 1 | 0 | 1 | V40 | V48 |
| 1 | 1 | 0 | V48 | V56 |
| 1 | 1 | 1 | V56 | V64 |

As shown in Table 1, if three bits D3, D4 and D5 are all zero, the first voltage level 35 ($V_{out1}$) becomes a voltage level V0 and the second voltage level 36 ($V_{out2}$) becomes a voltage level V8. Also, if three bits D3, D4 and D5 are 0, 0 and 1, respectively, the first voltage level 35 ($V_{out1}$) becomes a voltage level V32 and the second voltage level 36 ($V_{out2}$) becomes a voltage level V40. If three bits D3, D4 and D5 are all 1, the first voltage level 35 ($V_{out1}$) becomes a voltage level V56 and the second voltage level 36 ($V_{out2}$) becomes a voltage level V64, etc.

Alternatively, the voltage selector 31 can be formed by a multiplexer (MUX) and an analog switch.

The weight voltage generator 32 may include, and may be constituted by, three MOS transistors 42, 43 and 44 (Q0, Q1 and Q2) and a bias resistor 41, such that the sources and drains of the three MOS transistors 42, 43 and 44 (Q0, Q1 and Q2) are connected in parallel. The drains are connected to an input power source $V_{CC}$ via the bias resistor 41, which may be, for example, a linear resistor. The lower three bits D0, D1 and D2 are connected to the gates of the transistors Q0, Q1 and Q2, respectively.

As shown in the following Table 2, the current flowing through the bias resistor 41 changes according to the states of D0, D1 and D2, so that the weight voltage $V_y$, i.e., a voltage difference across the bias resistor 41 changes. The weight voltage $V_y$ determines the third and fourth voltage levels 37 and 38.

The weight voltages $V_y$ generated by the weight voltage generator 32 is given by $$V_y = \frac{j}{8K_2},$$

where j is the decimal representation of a binary number $(D2\ D1\ D0)_2$, i.e.,j=4 D2+2D1+D0. This formula is obtained as follows.

Assuming that the width-to-length ratios (W/L) of gates of transistors Q0, Q1 and Q2 are 1, 2, and 4, respectively, the ratio of the current flowing through the transistors Q0, Q1 and Q2 in their on-states becomes 1:2:4. The current flowing through each transistor in the saturation region is represented by $$i_0 = K_0\frac{W}{L}(V_{GS} - V_T)^2,$$

where $K_0$ is a constant, $V_{GS}$ is a fixed voltage difference between the gate and the source when the transistor is turned on, and $V_T$ is the threshold voltage of the transistor. Then, the total current $i_T$ becomes $$i_T = K_0(4D2+2D1+D0)\ (V_{GS}-V_T) = K_0 j\ (V_{GS}-V_T)^2.$$

Therefore, $$V_y = R \times i_T = jRK_0(V_{GS} - V_T)^2 = \frac{j}{8K_2},$$

where $K_2$ is a constant and defined as $K_2 = 1/\{8\ RK_0(V_{GS}-V_T)^2\}$.

For example, when only the transistor Q0 is turned on, $(D2\ D1\ D0)_2 = (001)_3$ and accordingly j=1. Thus, $V_y = 1/8K_2$. The following Table 2 indicates the output $V_y$ versus the combination of the input bits D2, $D_1$, and D0.

TABLE 2

| D2 | D1 | D0 | $V_y$ |
|---|---|---|---|
| 0 | 0 | 0 | $0/8K_2$ |
| 0 | 0 | 1 | $1/8K_2$ |
| 0 | 1 | 0 | $2/8K_2$ |
| 0 | 1 | 1 | $3/8K_2$ |
| 1 | 0 | 0 | $4/8K_2$ |
| 1 | 0 | 1 | $5/8K_2$ |
| 1 | 1 | 0 | $6/8K_2$ |
| 1 | 1 | 1 | $7/8K_2$ |

As understood from Table 2, if the lower bits D0, D1 and D2 are 1, 0 and 0, respectively, the transistor Q0 is turned on and the transistors Q1 and Q2 are turned off. Thus, the voltage drop $V_y$, is $1/8K_2$. Also, if the lower bits D0, D1 and D2 are 0, 0 and 1, respectively, the transistor Q2 is turned on and the transistors Q0 and Q1 are turned off. Thus, the voltage drop, $V_y$, is $1/8K_2 \times 4$. If the lower three bits D0, D1 and D2 are all 1, the transistors Q0, Q1 and Q2 are all turned on. Thus, the voltage drop $V_y$, is $1/8K_2 \times 7$.

The analog multiplier 33 adopts a Gilbert cell, for example. The Gilbert cell is well known and is described, for example, in the *IEEE* Journal, Solid-state circuit, Vol. sc-20, No. 6, December 1985, pp 1158–1168.

Among the various types of Gilbert cell, a circuit in FIG. 4 will now be described, as an example. Transistors M1 through M6 are all MOS transistors. The input-versus-output operational characteristics of the Gilbert cell having such a configuration are given by $$V_o = K_1 \cdot V_x \cdot V_y,$$

where $V_o$ is a voltage difference between nodes N1 and N2, and $K_1$ is a constant depending on the width-to-length ratios (W/L) of the gates of the transistors.

Figure 5:
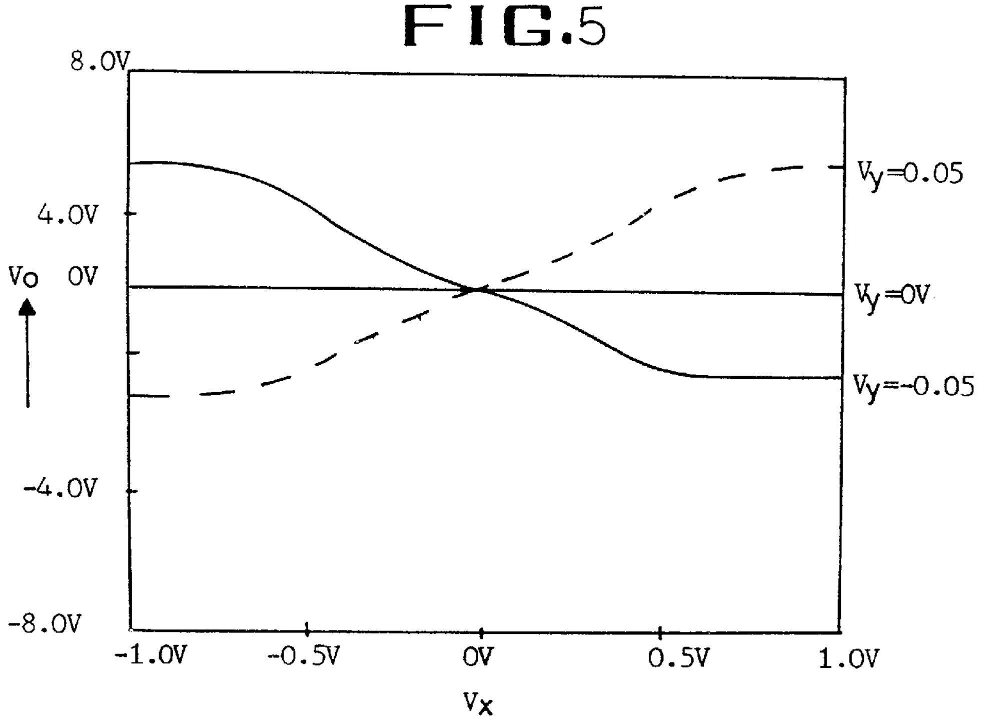
FIG. 5 is a graph showing characteristics of a Gilbert cell.

FIG. 5 shows the output voltage $V_o$ versus $V_x$ with various values of $V_y$. It shows that the output voltage $V_o$ changes according to the polarity of $V_x$ and the magnitude of $V_y$, obeying the above relationship; $V_o = K_1 \cdot V_x \cdot V_y$.

Figure 6:
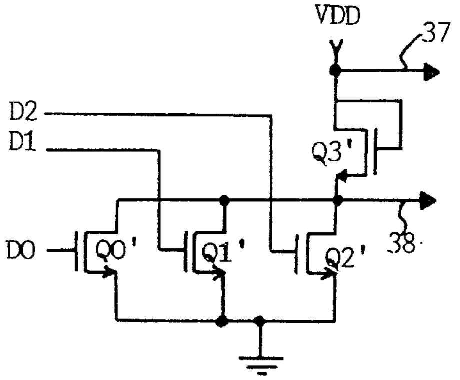
FIGS. 6 and 7 are circuit diagrams showing second and third embodiments of the present invention, respectively.
Figure 7:
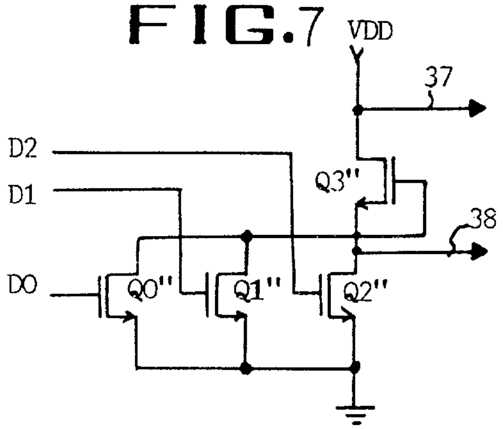

FIGS. 6 and 7 are circuit diagrams showing second and third embodiments of the present invention, respectively. They show modifications of circuitry for the weight voltage generator 32. In FIG. 6, the generator 32 includes three MOS transistors Q0', Q1' and Q2' and a resistor or load MOS transistor Q3'. In FIG. 7, the generator 32 includes three MOS transistors Q0", Q1" and Q2" and a resistor or load MOS transistor Q3".

In FIG. 6, the respective sources and drains of MOS transistors Q0', Q1' and Q2' are connected in parallel, and the lower three bits D0, D1 and D2 of a 6-bit video data are connected to the gates of transistors Q0', Q1' and Q2', respectively. Also, the power source Vdd is connected to the gate of NMOS transistor Q3'.

In FIG. 7, the respective sources and drains of MOS transistors Q0", Q1" and Q2" are connected in parallel, and the lower three bits D0, D1 and D2 of a 6-bit video data are connected to the gates of transistors Q0", Q1" and Q2", respectively. Also, the drains of transistors Q0', Q1' and Q2' are connected to the gate of MOS transistor Q3".

As in the case of the first embodiment, the current flowing through the resistor MOS transistor changes according to the state of D0, D1 and D2, so that a voltage difference between the third and fourth voltage levels 37 and 38 changes. The operation of the weight voltage generator 32 in FIGS. 6 and 7 is similar to that of a weight voltage generator 32 in FIG. 4, except that the bias resistor 41 in FIG. 4 is replaced by transistor Q3' or Q3".

The analog adder 34 can be simply constructed by a differential amplifier 47 and an adder 48. Parameters such as $K_0$ and $K_1$ can be so adjusted that the amplification factor of the differential amplifier 47 can be set to 1. The output voltage (multiplication voltage) $V_0$ of the Gilbert cell 33 is connected to two inputs of the differential amplifier 47. The output voltage $V_0$" of the differential amplifier 47 is connected to one input of the adder 48 and the first voltage level 35 is connected to the other input of the adder 48. The adder 48 adds the output voltage $V_0$' of the differential amplifier 47 to the first voltage level 35 and outputs the resultant voltage as a final output voltage $V_{out}$.

The overall operation will now be described in more details. To represent the 6-bit video data, 64 voltages sources are conventionally required. However, according to the circuit design of the present invention, only 8 voltage sources are necessary to generate 64 voltage levels (gray scales or color densities).

In the circuit shown in FIG. 4, the upper 3 bits of the 6-bit video data select a voltage interval among given voltage sources. For example, when D5=1, D4=0 and D3=0, the voltage selector 31 outputs V32 ($=V_{8i}$) to the first voltage level $V_{out1}$ and outputs V40 ($=V_{8(i+1)}$) to the second voltage level $V_{out2}$. Here, i is the decimal representation of a binary number $(D5\ D4\ D3)_2$, i.e., i=4 D5+2 D4+D3.

The lower 3 bits determine the third and fourth voltage levels. For example, the output voltage $V_y$ depends on the width-to-length ratio (W/L) of the transistors Q0, Q1 and Q2, and is given by $j/8K_2$, where $j=(D2D1D0)_2$.

Then, the output voltages $V_x$ and $V_y$ are multiplied in the Gilbert cell 33 to generate an output voltage $$V_0=[V_{8(i+1)}-V_{8i}]\times\frac{jK_1}{8K_2}.$$

The output voltage $V_0$ of the Gilbert cell 33 is applied to the differential amplifier 47 whose amplification factor is $K_2/K_1$. Thus, the output voltage $V_0'$ of the differential amplifier 47 becomes $$V_0=[V_{8(i+1)}-V_{8i}]\times\frac{j}{8}.$$

Next, the adder 48 adds the first voltage level $V_{8i}$ (V32) to the output voltage $$V_0=[V_{8(i+1)}-V_{8i}]\times\frac{j}{8}$$

and outputs $$V_0=[V_{8(i+1)}-V_{8i}]\times\frac{j}{8}+V_{8i}.$$

Thus, 8 gray scale voltage levels are formed between the voltages $V_{8i}$ and $V_{8(i+1)}$ through the Gilbert cell 33. Since the numeral i runs from 0 to 7, 64 gray scale voltage levels (8×8=64) are generated at $V_{out}$. In other words, 8 voltage levels, are generated at the voltage selector 31 according to $(D5D4D3)_2$, and 8 voltages levels are generated at the weight voltage generator 32 according to $(D2D1D0)_2$. They are multiplied in the analog multiplier (Gilbert cell) 33 so that a total of 64 voltage levels is outputted.

The above embodiments are described in the case of a 6-bit video data. However, the circuit described above can be easily generalized in the case of a video data having any number of bit(s), by adjusting the number of voltage sources and MOS transistors in the weight voltage generator 32.

As described above, according to the present invention, multiple gray scales can be displayed with fewer voltage sources than in the conventional circuits. For example, in representing an m-bit video data, $2^m/n$ weight voltages can be generated by using n voltage sources to the display $2^m$ gray scales.

It will be apparent to those skilled in the art that various modifications and variations can be made in the multiple gray scale voltage generator for driving LCD panel of the present invention without departing from the spirit or scope of the invention. Thus, it is intended that the present invention cover the modifications and variations of this invention provided they come within the scope of the appended claims and their equivalents.

In particular, in the descriptions above, all the MOS transistors are assumed to be NMOS types (n-channel type). However, it should be apparent for one of ordinary skill in the art that these transistors may be replaced by PMOS (or p-channel) transistors by inverting the polarities of the operating voltages, etc.

What is claimed is:

1. A multiple voltage generator for driving a liquid crystal display (LCD) panel by video data having a first part and a second part, the video data including a plurality of bits, and the first part of the video data including a first set of bits selected from the plurality of bits, and the second part of the video data including a second set of bits selected from the plurality of bits, the voltage generator comprising:

a voltage selector receiving the first part of the video data, and outputting first and second voltage levels according to the first part of the video data, wherein the first and second voltage levels define a first voltage differential;

a weight voltage generator receiving the second part of the video data, and outputting a second voltage differential selected from a plurality of possible output voltage differentials, the selection of the second voltage differential from the plurality of possible output voltage differentials being dependent upon the second part of the video data, wherein the weight voltage generator includes a bias-resistor element; and a plurality of MOS transistors connected in parallel, each of which has a gate, a source, and a drain, wherein the bias-resistor is connected between the drains of the MOS transistors and a power source, the sources of the MOS transistors are connected to a reference voltage, and the second set of bits, being connected to the gates of the MOS transistors, respectively, such that a current flowing through the bias-resistor element changes according to the second set of bits, and a voltage difference across the bias-resistor element defines the second voltage differential;

a multiplier, connected to the voltage selector and the weight voltage generator, for multiplying the first voltage differential and the second voltage differential to output a multiplication voltage; and an adder, connected to the voltage selector and the multiplier, for adding the first voltage level and the multiplication voltage to output a driving voltage.

2. The multiple voltage generator according to claim 1, wherein the bias-resistor element includes a linear resistor.

3. The multiple voltage generator according to claim 1, wherein the bias-resistor element includes a MOS transistor.

4. The multiple voltage generator according to claim 3, wherein the MOS transistor includes an NMOS transistor.

5. A multiple voltage generator for driving a liquid crystal display (LCD) panel by video data having a first part and a second part, the video data including a plurality of bits, and the first part of the video data including a first set of bits selected from the plurality of bits, and the second part of the video data including a second set of bits selected from the plurality of bits, the voltage generator comprising:

a plurality of voltage sources for generating a plurality of voltage levels;

a voltage selector connected to the plurality of voltage sources, receiving the first part of the video data, and selecting first and second voltage levels out of the plurality of voltage levels according to the first part of the video data, wherein the first and second voltage levels are adjacent to each other and defining a first voltage differential;

a weight voltage generator receiving the second part of the video data and generating third and fourth voltage levels defining a second voltage differential, the second voltage differential being selected from a plurality of possible output voltage differentials in accordance with the second part of the video data, wherein the weight voltage generator includes a bias-resistor element having a first terminal coupled to a power source; and a plurality of MOS transistors connected in parallel, each of which has a gate, a source, and a drain, wherein a second terminal of the bias-resistor is connected to the drains of the MOS transistors, the sources of the MOS transistors are connected to a reference voltage, and the second set of bits are connected to the gates of the plurality of MOS transistor such that a current flowing through the bias-resistor element changes according to the second set of bits, and wherein a voltage difference across the bias-resistor element defines the second voltage differential;

a multiplier, connected to the voltage selector and the weight voltage generator, for multiplying the first voltage differential by the second voltage differential with a multiplication factor to output a multiplication voltage such that the multiplication voltage is within the first voltage differential; and an adder, connected to the voltage selector and the multiplier, for adding the first voltage level and the multiplication voltage to output a driving voltage.

6. The multiple voltage generator according to claim 5, wherein the bias-resistor element includes a linear resistor.

* * * * *